(12) United States Patent  (10) Patent No.: US 8,219,259 B2
Haugh  (45) Date of Patent: Jul. 10, 2012

(54) MAINTAINING UNIFORM POWER CONSUMPTION FROM AN ELECTRIC UTILITY BY A LOCAL LOAD IN A POWER DISTRIBUTION SYSTEM

(75) Inventor: Julianne F. Haugh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 370 days.

(21) Appl. No.: 12/477,482

(22) Filed: Jun. 3, 2009

(65) Prior Publication Data
US 2010/0312412 A1  Dec. 9, 2010

(51) Int. Cl.
G05D 3/12 (2006.01)
G05D 5/00 (2006.01)
G05D 9/00 (2006.01)
G05D 11/00 (2006.01)
G05D 17/00 (2006.01)
G01R 21/00 (2006.01)
G01R 21/06 (2006.01)
G01R 31/36 (2006.01)

(52) U.S. Cl. ........ 700/295; 700/286; 700/291; 700/297; 702/61; 702/62; 702/63

(58) Field of Classification Search .................. 700/286, 700/291, 295, 297; 323/209–303; 702/60–63
See application file for complete search history.

(56) References Cited

U.S. PATENT DOCUMENTS

| | | | |
|---|---|---|---|
| 4,235,221 A | 11/1980 | Murphy | |
| 4,620,283 A | 10/1986 | Butt | |
| 5,430,430 A * | 7/1995 | Gilbert | 340/870.02 |
| 6,681,156 B1 | 1/2004 | Weiss | |
| 6,785,592 B1 * | 8/2004 | Smith et al. | 700/291 |
| 6,865,685 B2 | 3/2005 | Hammond et al. | |
| 6,900,566 B2 | 5/2005 | Misaki | |
| 6,925,361 B1 | 8/2005 | Sinnock | |
| 6,963,802 B2 * | 11/2005 | Enis et al. | 702/2 |
| 7,043,380 B2 * | 5/2006 | Rodenberg et al. | 702/62 |
| 7,051,529 B2 | 5/2006 | Murphy et al. | |
| 7,142,949 B2 | 11/2006 | Brewster | |
| 7,274,974 B2 | 9/2007 | Brown et al. | |
| 7,274,975 B2 | 9/2007 | Miller | |
| 7,397,142 B1 * | 7/2008 | Cooper | 290/44 |
| 7,519,658 B1 | 4/2009 | Anglin | |
| 7,783,390 B2 * | 8/2010 | Miller | 700/291 |
| 7,797,084 B2 * | 9/2010 | Miwa | 700/296 |
| 2006/0277457 A1 | 12/2006 | Salkind | |
| 2008/0021976 A1 | 1/2008 | Chen | |
| 2008/0167756 A1 | 7/2008 | Golden | |
| 2008/0222097 A1 | 9/2008 | Jania | |

(Continued)

*Primary Examiner* — Ramesh Patel
(74) *Attorney, Agent, or Firm* — Brevetto Law Group

(57) ABSTRACT

Maintaining uniform power consumption from an electric utility by a local load in a power distribution that includes a distributed renewable generation ('DRG') system that is capable of providing power to the utility and batteries for storage, where maintaining uniform power consumption is carried out iteratively and includes monitoring present power consumption of the local load from the electric utility; determining whether the present power consumption is greater than a predefined target power consumption by the local load; if the present power consumption is not greater, storing locally generated power in the batteries; if the present power consumption is greater: calculating in dependence upon present local power generation by the DRG system, the predefined target power consumption, and the present power consumption of the local load, an amount of locally generated power to provide to the electric utility; and providing the amount of locally generated power to the electric utility.

23 Claims, 5 Drawing Sheets

U.S. PATENT DOCUMENTS

| | | | |
|---|---|---|---|
| 2008/0272934 A1* | 11/2008 | Wang et al. | 340/870.11 |
| 2009/0094345 A1 | 4/2009 | Kang | |
| 2009/0112935 A1 | 4/2009 | Hefta-Gaub | |
| 2009/0172635 A1 | 7/2009 | Auriemma | |
| 2009/0187499 A1 | 7/2009 | Mulder | |
| 2009/0217287 A1 | 8/2009 | Blum | |
| 2009/0240449 A1* | 9/2009 | Gibala et al. | 702/62 |
| 2009/0276263 A1 | 11/2009 | Deb | |
| 2009/0276500 A1 | 11/2009 | Karmarkar | |
| 2010/0076615 A1* | 3/2010 | Daniel et al. | 700/293 |
| 2010/0094479 A1* | 4/2010 | Keefe | 700/298 |
| 2010/0145542 A1 | 6/2010 | Chapel | |
| 2010/0145884 A1 | 6/2010 | Paik | |
| 2010/0174418 A1* | 7/2010 | Haugh | 700/295 |
| 2010/0191489 A1 | 7/2010 | Zolot | |
| 2010/0198421 A1 | 8/2010 | Fahimi | |
| 2010/0250014 A1 | 9/2010 | Taft | |
| 2010/0293045 A1* | 11/2010 | Burns et al. | 705/14.11 |
| 2010/0312412 A1 | 12/2010 | Haugh | |

* cited by examiner

MAINTAINING UNIFORM POWER CONSUMPTION FROM AN ELECTRIC UTILITY BY A LOCAL LOAD IN A POWER DISTRIBUTION SYSTEM

BACKGROUND OF THE INVENTION

1. Field of the Invention

The field of the invention is data processing, or, more specifically, methods, apparatus, and products for maintaining uniform power consumption from an electric utility by a local load in a power distribution system.

2. Description of Related Art

Today, electricity for loads such as residential housing, commercial businesses, industrial plants, and so on may be generated by multiple different sources. One source of electricity is the traditional electric utility. Another possible source is an on-site power source, such as a distributed renewable generation ('DRG') system. In some cases, the DRG system and utility share the responsibility of generating power for a load. Further, the DRG system may be configured to provide power, generated by the DRG system, to the utility itself. From the prospective of the electric utility, power provided to utility from the DRG system is a reduction in the power consumption of the load. Such DRG systems in current art, however, typically provide power to the utility erratically, causing system instability, and increased cost for electric utility which must insure that the amount of power produced on electric grid at large matches power consumed by all loads.

SUMMARY OF THE INVENTION

Methods, apparatus, and products for maintaining uniform power consumption from an electric utility by a local load in a power distribution system are disclosed. The power distribution system in embodiments of the present invention includes a distributed renewable generation ('DRG') system where the DRG system is capable of providing power to the electric utility and one or more batteries for storage, Maintaining uniform power consumption according to embodiments of the present invention is carried out iteratively during operation of the power distribution system and includes monitoring, by a control module, present power consumption of the local load from the electric utility; determining, by the control module, whether the present power consumption is greater than a predefined target power consumption by the local load; if the present power consumption is not greater than the predefined target power consumption by the local load, storing, by the control module, locally generated power in the batteries; if the present power consumption is greater than the predefined target power consumption by the local load: calculating, by the control module, in dependence upon present local power generation by the DRG system, the predefined target power consumption, and the present power consumption of the local load, an amount of locally generated power to provide to the electric utility; and providing, by the control module, the amount of locally generated power to the electric utility.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
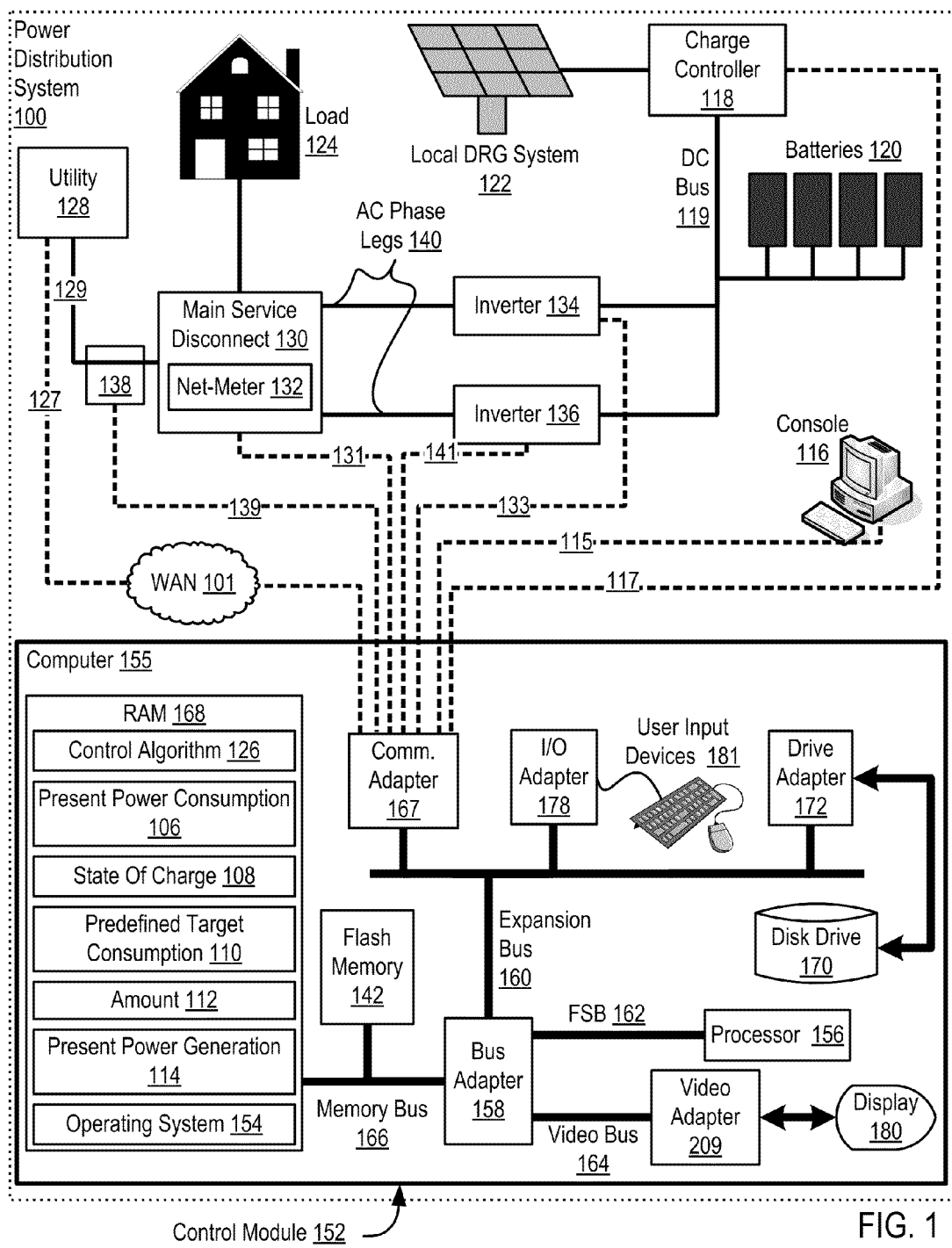
FIG. 1 sets forth a block diagram of an exemplary power distribution system for which uniform power consumption from an electric utility is maintained according to embodiments of the present invention.

Exemplary methods, apparatus, and products for maintaining uniform power consumption from an electric utility by a local load in a power distribution system in accordance with the present invention are described with reference to the accompanying drawings, beginning with FIG. 1. FIG. 1 sets forth a block diagram of an exemplary power distribution system (100) for which uniform power consumption from an electric utility (128) is maintained according to embodiments of the present invention.

A power distribution system (100) as term is used in this specification is a collection of computer hardware, computer software, machinery, and other components that distributes power from one or more sources to one or more loads, where at least one source is a distributed renewable generation ('DRG') system. The example power distribution system (100) of FIG. 1 includes a local renewable generation ('DRG') system (122) that is capable of providing power to an electric utility (128) and one or more batteries (120) for storage. DRG systems are power generation technologies that provide an alternative to or an enhancement of traditional electric utility power systems. DRG systems are described as 'renewable' when resources used to generate power in the system are renewable resources such as wind, solar power, and water. Examples of DRG systems useful in power distribution systems in which uniform power consumption by a local load from an electric utility is maintained according to embodiments of the present invention include photovoltaic ('PV') systems, micro-hydroelectric systems, and wind turbine systems.

The example DRG system (112) in FIG. 1 is depicted as a 'local' DRG system, so described because the DRG system is maintained and operated by and for the benefit of the owner of the power distribution system in contrast to DRG systems located and operated by other entities. 'Local' here may also mean that the DRG system is physically located near the load to which the DRG system provides power, but such a limitation on location is not necessary. That is, a local DRG system in a power distribution system for which uniform power consumption by a local load from an electric utility is maintained in accordance with embodiments of the present invention may be physically located near the load to which the DRG system provides power or not.

DRG systems that provide power to an electric utility do so according to a net-metering policy. A net-metering policy is an electricity policy that specifies that a DRG system owner receives, from a utility, one or more credits for at least a portion of electricity generated by the DRG system and provided to the utility. That is, a utility pays a DRG system owner for electricity received by the utility and generated by the owner's DRG system. In prior art, such 'payment' is carried out by literally spinning an electricity meter backwards for power generated by a DRG system and provided to the utility. Such bi-directional meters are referred to as net-meters (132).

Installed as part of the main service disconnect (132) is a net-meter (132). Readers of skill in the art will recognize that inclusion of the net-meter as part of the main service disconnect (130) is for purposes of clarity not limitation, a net-meter used in accordance with embodiments of the present invention may be configured as a stand alone device, a component separate and apart from the main service disconnect. A net-meter is device that meters net-electricity distributed through the main service disconnect to the load. The term 'net' here refers to the difference in power provided to the load (124) from the utility and locally generated power provided to the load and provided to the utility along power line (129). Locally generated power as the term is used in this specification refers, as context requires, to any power generated by a local DRG system (122) in a power distribution system (100), whether that power is currently generated and not stored or the power was previously generated and stored in the batteries.

The power distribution system in the example of FIG. 1 distributes power to a local load (124). A local load (124) is an electrical load, a consumer of power. The local load (124) in the example of FIG. 1 receives operational power, typically AC power; through the main service disconnect (130). A main service disconnect is a switch that when open, disconnects the load (124) from power provided by the utility (128). Although not shown here for clarity, readers of skill in the art will recognize that other electrical distribution components may be connected to the main service disconnect (130) for distributing power to the load (124) such as line conditioners, circuit breakers, and the like. The main service disconnect in the example of FIG. 1 may be provided power to distribute to the load (124) from one or more sources: an electric utility (128) through power line (129) and the local DRG system (122) through the charge controller (118), Direct Current ('DC') bus (119), power inverters (134, 136), and phase legs (140).

A charge controller (118) is a device that limits the rate at which electric current generated by the local DRG system (122) is added to or drawn from electric batteries along the DC bus (119). The example charge controller (118) is configured to monitor the battery's present state of charge. The term 'state of charge' as used in this specification may refer to either or both of a relative state of charge with respect to total battery capacity, such as 90% charged, or a present battery capacity, such as 24 KW of a 26.7 KW battery, as context requires.

The power inverters (134, 136) are configured to convert DC power into AC power. The inverters in the example of FIG. 1 are grid-tie inverters: inverters that monitor AC supply waveforms from the utility (128) along power line (129), also referred to as 'mains,' and invert DC power from the local DRG system to AC power in phase with the AC supply for supply to a load (124) and the utility (128). The example power inverters (134, 136) of FIG. 1 are configured to sense AC production along the phase legs.

The example system (100) of FIG. 1 also includes a control module (152). A control module (152) is a module of automated computing machinery that maintains uniform power consumption from the electric utility by the local load in the power distribution system (100) in accordance with embodiments of the present invention. That is, a control module (152) may be implemented as an aggregation of computer hardware and software. In the example of FIG. 1, the control module (152) is implemented as a computer (155) that includes at least one computer processor (156) or 'CPU' as well as random access memory (168) ('RAM') which is connected through a high speed memory bus (166) and bus adapter (158) to processor (156) and to other components of the computer (155).

The exemplary computer (155) of FIG. 1 includes a communications adapter (167) for data communications with other computers, with a data communications network, wide area network ('WAN') (101), and with the following devices:
  the electric utility (128) connected through the WAN (101) and data communications connection (127) to the computer (155);
  the main service disconnect (130) through data communications connection (131);
  the inverter (136) through data communications connection (141);
  the inverter (134) through data communications connection (133);
  the console (116) through data communications connection (115);
  the charge controller (118) through data communications connection (117);
  and the current sensor (138) through data communications connection (139).

Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for maintaining uniform power consumption from an electric utility by a local load in a power distribution system (100) according to embodiments of the present invention include modems for wired dial-up communications, Ethernet (IEEE 802.3) adapters for wired data communications network communications, and 802.11 adapters for wireless data communications network communications. In this example, each of the above devices is connected to the computer (155) for data communications through the communications adapter (167) for clarity of explanation, not limitation. Readers of skill in the art will immediately recognize that such devices may be connected to the computer (155) for data communications in other ways, through other network types, through different adapters, through out-of-band buses, and so on.

Stored in RAM (168) of the computer (155) is a control algorithm, a module of computer program instructions that when executed operates the computer (155) as a control module (152) for maintaining uniform power consumption by the local load from the electric utility in the power distribution system (100) of FIG. 1 in accordance with embodiments of the present invention. Maintaining such uniform power consumption in embodiments of the present invention is carried out iteratively during operation of the power distribution system (100). The control module (152) of FIG. 1 maintains such uniform power consumption in the example power distribution system (100) in accordance with embodiments of the present invention by monitoring present power consumption (106) of the local load (124) from the electric utility (128); determining whether the present power consumption (106) is greater than a predefined target power consumption (110) by the local load (124); if the present power consumption (106) is not greater than the predefined target power consumption (110) by the local load (124), storing locally generated power in the batteries (120); if the present power consumption (106) is greater than the predefined target power consumption (110) by the local load (124): calculating in dependence upon present local power generation (114) by the DRG system (120), the predefined target power consumption (110), and the present power consumption (106) of the local load (124), an amount (112) of locally generated power to provide to the electric utility (128); and providing the amount (112) of locally generated power to the electric utility (128).

Monitoring present power consumption (106) of the local load (124) from the electric utility (128) may be carried out by monitoring, with a current sensor (138), current draw by the local load (124) from the electric utility (128). Many power distribution systems of the prior art do not monitor power consumption from an electric utility at all. In fact, many such systems have no capability to monitor such power consumption. Here, in contrast to those systems of the prior art, a current sensor (138) is added to the main electric utility feed (129) to the main service disconnect (130) to facilitate such monitoring.

The control module (152) may determine whether the present power consumption (106) is greater than a predefined target power consumption (110) by the local load (110) by comparing the values of the present power consumption (106) and the predefined target power consumption (110). In some embodiments, the control module determines that the present power consumption (106) is greater than the predefined target power consumption (110) by the local load (124) only if the present state of charge (108) of the batteries (120) is greater than a predetermined threshold (not shown here). That is, even if the value of present power consumption is higher than the target consumption, if the present state of charge (108) of the batteries (120) is not greater than a predetermined threshold, the control module (152) operates as if the present power consumption (106) is in fact not greater than the target power consumption (110). Consider, as an example, that the present state of charge (108) of the batteries is 5%, the predefined threshold is 10%, and present power consumption (106) is greater than the target power consumption (110). In such an example embodiment, the control module (152) operates as if the present power consumption (106) is not greater than the target power consumption (110)—effectively determining that the present power consumption (106) is not greater than the target power consumption (110) and present local power generation is stored in the batteries, not provided to the electric utility.

A further variation of this example embodiment may also be implemented in which the control module (152) operates as if the present power consumption (106) is not greater than the target power consumption (110) only if the present state of charge (108) is greater than a predetermined threshold and only if the difference in the present power consumption (106) and target power consumption (110) is greater than a predetermined consumption threshold. Consider, as an example, that the present state of charge (108) of the batteries is 11%, the predefined threshold for the battery is 10%, present power consumption (106) is 451 W, the target power consumption (110) is 450 W, and the predetermined consumption threshold is 15 W. In this example, the difference in the present power consumption and target power consumption is only 1 W, 14 W less than the predetermined consumption threshold. In this example then the control module (152) operates as if the present power consumption (106) is not greater than the target power consumption (110)—effectively determining that the present power consumption (106) is not greater than the target power consumption (110) and present local power generation is stored in the batteries, not provided to the electric utility. Readers of skill in the art will immediately understand that these examples are but two of many possible methods of determining whether the present power consumption (106) is greater than the predefined target power consumption (110) according to embodiments of the present invention. Other methods of determining whether the present power consumption (106) is greater than the predefined target power consumption (110) are also well within the scope of this invention.

The target power consumption (110) is the power consumption which the control module attempts to maintain during operation of the power distribution system. The control module is said to 'attempt' to maintain the power consumption of the local load because methods of maintaining uniform power consumption according to embodiments of the present invention are reactionary not proactive and actual power consumption by the load from the electric utility and actual power generation by the local DRG system may vary significantly and quickly. In this way, the target power consumption (110) operates as a setpoint in a feedback control system—a value which the feedback control system attempts to reach continuously. In some embodiments the target power consumption (110) is a moving average of demand by a local load. Consider as an example of a moving average of demand that a local load consumes, on average, 25 kWH per day and locally generates 15 kWH per day, a difference of 10 kWH per day. The target power consumption may then be derived on a per hour basis—approximately 416 watts.

The control module (152) of FIG. 1 stores locally generated power in the batteries (120) by instructing the charge controller (118) through data communications connection (118) to divert some or all power generated by the local DRG system (122) to the batteries (120) along the DC bus (119) rather than to the inverters (134, 136) and configuring the inverters (134, 136) through data communications connections (131, 141) to not invert the DC power from the DC bus to AC power along the AC phase legs (140). Such data communications between the control module (152) and the inverters and charge controller may be in any form of data communications as will occur to readers of skill in the art such as, for example, Transistor-Transistor Logic ('TTL') level control signals or more complex packet-based communication.

The control module (152) receives data representing present local power generation by the DRG system from the charge controller (118) through data communications connection (117). The control module may use such data, along with the predefined target power consumption (106), and present power consumption (106) of the local load to calculate an amount (112) of locally generated power to provide to the electric utility. The control module may calculate an amount (112) of locally generated power to provide to the electric utility in various ways including, for example, by looking up an amount (112) in a table, database, or other structure for the values of the predefined target power consumption (110), the present power consumption (106), and present power generation (114).

The control module (152) of FIG. 1 provides locally generated power to the electric utility (128) by instructing the charge controller (118) through data communications connection (118) to divert some or all power generated by the local DRG system (122) along the DC bus (119) to the inverters (134, 136) rather than to the batteries (120), and configuring the inverters (134, 136) through data communications connections (131, 141) to invert the DC power to AC power along the AC phase legs (140). Another way in which the control module (152) provides locally generated power to the electric utility (128) is by instructing the charge controller (118) through data communications connection (118) to divert power previously stored in the batteries (120) along the DC bus (119) to the inverters (134, 136) and configuring the inverters (134, 136) through data communications connections (131, 141) to invert the DC power to AC power along the AC phase legs (140).

Also stored in RAM (168) is an operating system (154). Operating systems useful for maintaining uniform power consumption by a local load from an electric utility in a power distribution system (100) according to embodiments of the present invention include UNIX™, Linux™, Microsoft XP™, AIX™, IBM's i5/OS™, and others as will occur to those of skill in the art. The operating system (154), control algorithm (126), present power consumption (106), the present state of charge (108) of the batteries (120), and so on, in the example of FIG. 1 are shown in RAM (168), but many components of such software typically are stored in non-volatile memory also, such as, for example, on a disk drive (170).

The computer (155) of FIG. 1 includes disk drive adapter (172) coupled through expansion bus (160) and bus adapter (158) to processor (156) and other components of the computer (155). Disk drive adapter (172) connects non-volatile data storage to the computer (155) in the form of disk drive (170). Disk drive adapters useful in computers for maintaining power consumption by a local load from an electric utility in a power distribution system (100) according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory, such as 'EEPROM' or 'Flash' memory (142), RAM drives, and so on, as will occur to those of skill in the art.

The example computer (155) of FIG. 1 also includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (155) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The control module (152) is implemented in the example system (100) of FIG. 1 as a standalone computer (155) for clarity of explanation only, not limitation. Readers of skill in the art will immediately understand that such a computer, or operative components of the computer, may be implemented as part of another component in the power distribution system (100) such as, for example, the net-meter (132), inverters (134, 136), and so on.

The arrangement of devices making up the exemplary system illustrated in FIG. 1 is for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
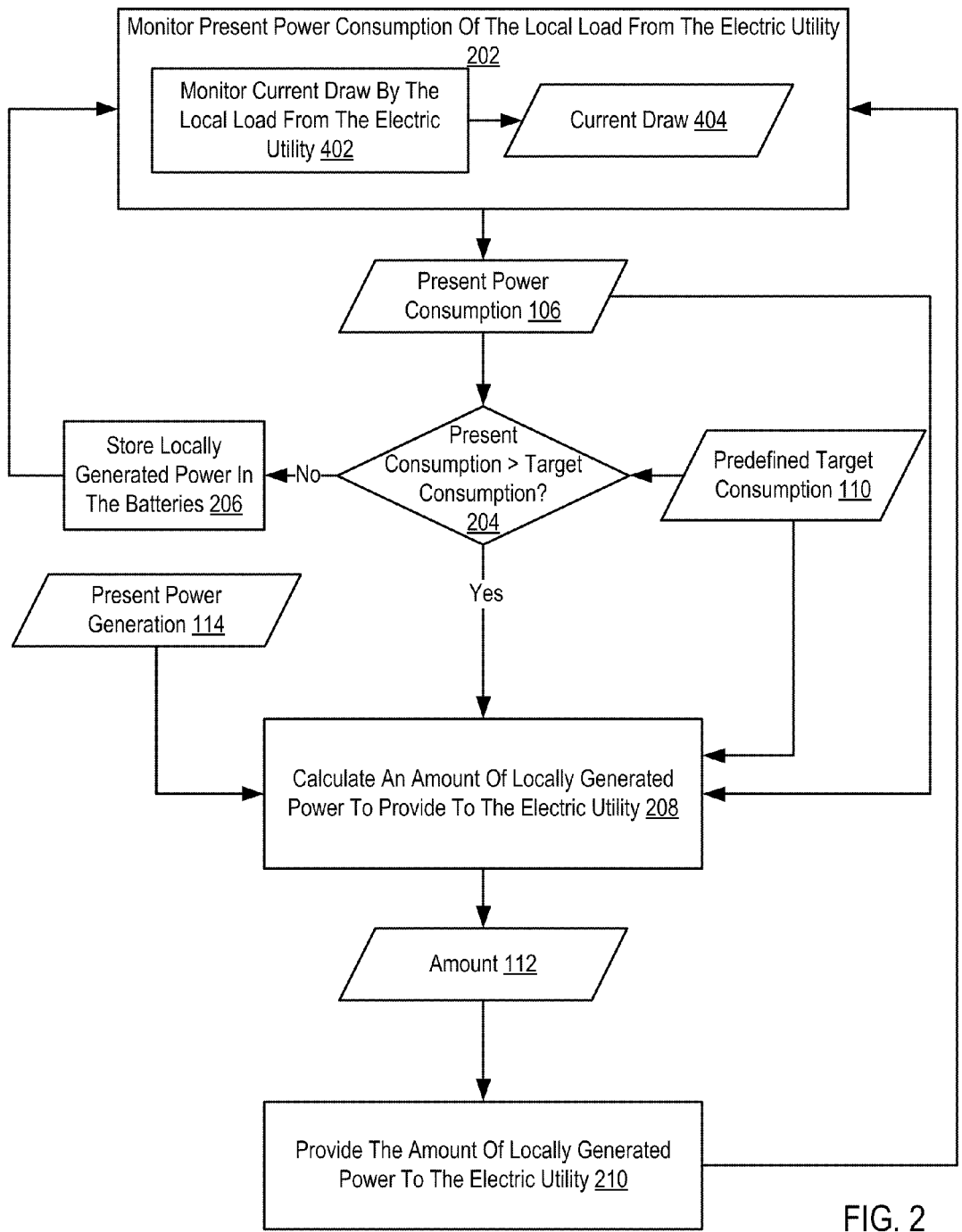
FIG. 2 sets forth a flow chart illustrating an exemplary method for maintaining uniform power consumption from an electric utility by a local load in a power distribution system according to embodiments of the present invention.

For further explanation, FIG. 2 sets forth a flow chart illustrating an exemplary method for maintaining uniform power consumption from an electric utility by a local load in a power distribution system according to embodiments of the present invention. The method of FIG. 2 is carried out by a control module similar to the control module (152) depicted in FIG. 1 to maintain uniform power consumption from an electric utility (128 on FIG. 1) by a local load (106 on FIG. 1) in a power distribution system (100 on FIG. 1) where the power distribution system includes a DRG system (122 on FIG. 1) and the DRG system is capable of providing power to the electric utility (128 on FIG. 1) and one or more batteries (120 on FIG. 1) for storage. The method of FIG. 2 is also carried out iteratively during operation of such a power distribution system (100 on FIG. 1).

The method of FIG. 2 includes monitoring (202), by the control module, present power consumption (106) of the local load from the electric utility. In the method of FIG. 2, monitoring (202) present power consumption (106) of the local load from the electric utility is carried out by monitoring (402), with a current sensor (138 on FIG. 1), current draw (404) by the local load from the electric utility.

The method of FIG. 2 also includes determining (204), by the control module, whether the present power consumption (106) is greater than a predefined target power consumption (110) by the local load. If the present power consumption (106) is not greater than the predefined target power consumption (110) by the local load, the method of FIG. 2 continues by storing (206), by the control module, locally generated power in the batteries. Storing locally generated power in the batteries may be carried out for some predefined amount of time or to attain a predefined state of charge, or in other ways such that a subsequent iteration of the method of FIG. 2 proceeds.

If the present power consumption (106) is greater than the predefined target power consumption (110) by the local load the method of FIG. 2 continues by calculating (208), by the control module, in dependence upon present local power generation (114) by the DRG system, the predefined target power consumption (110), and the present power consumption (106) of the local load, an amount (112) of locally generated power to provide to the electric utility and providing (210), by the control module, the amount (112) of locally generated power to the electric utility. As mentioned above, calculating (208) an amount (112) of locally generated power to provide to the electric utility may be carried out by looking up an amount (112) in a table, database, or other structure for the values of the predefined target power consumption (110), the present power consumption (106), and present power generation (114).

Figure 3:
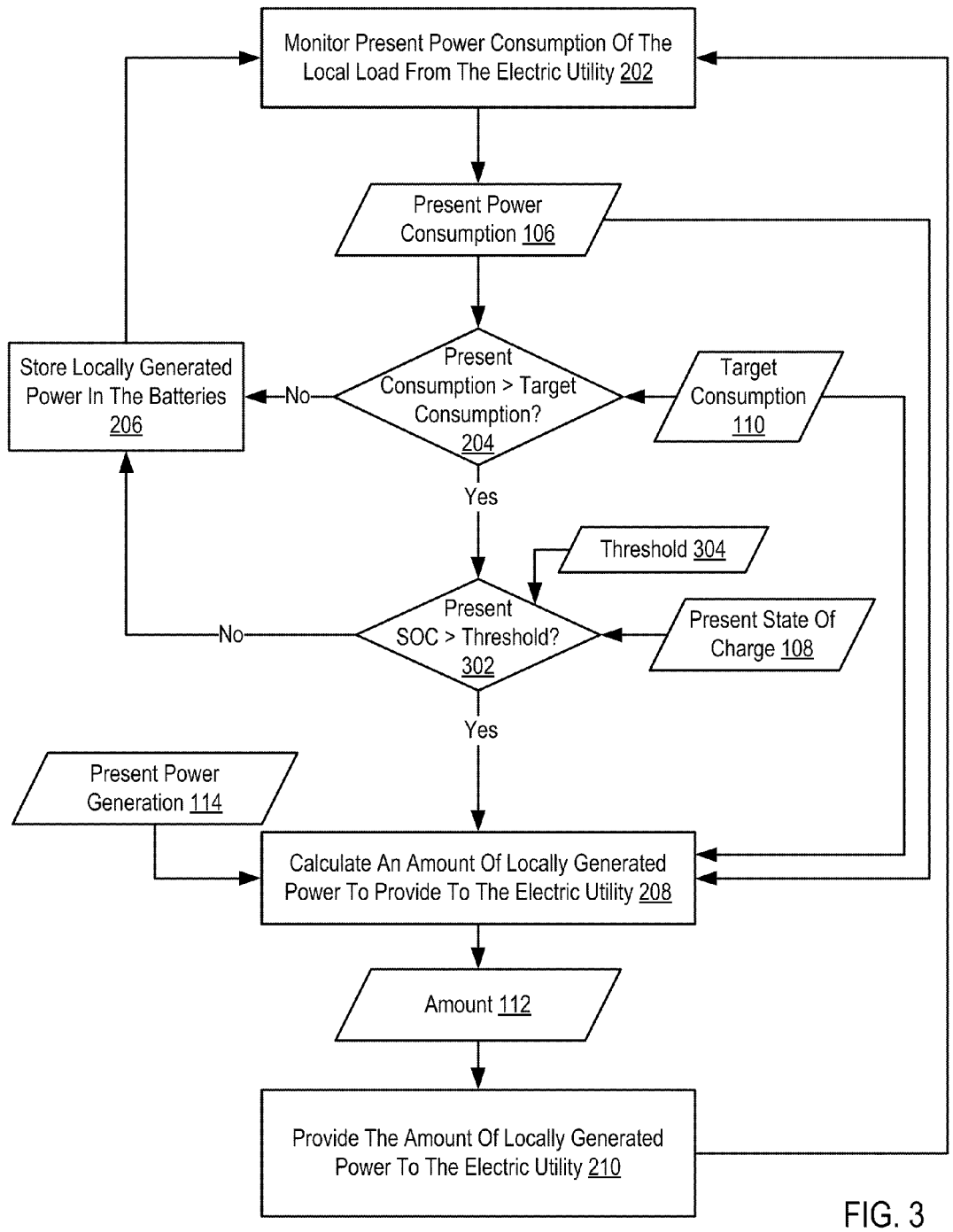
FIG. 3 sets forth a flow chart illustrating a further exemplary method for maintaining uniform power consumption from an electric utility by a local load in a power distribution system according to embodiments of the present invention.

For further explanation, FIG. 3 sets forth a flow chart illustrating a further exemplary method for maintaining uniform power consumption from an electric utility by a local load in a power distribution system according to embodiments of the present invention. The method of FIG. 3 is similar to the method of FIG. 2 in that the method of FIG. 3 is also carried out by a control module (152 on FIG. 1) to maintain uniform power consumption from an electric utility (128 on FIG. 1) by a local load (106 on FIG. 1) in a power distribution system (100 on FIG. 1) where the power distribution system includes a DRG system (122 on FIG. 1) and the DRG system is capable of providing power to the electric utility (128 on FIG. 1) and one or more batteries (120 on FIG. 1) for storage. The method of FIG. 3, also like the method of FIG. 2, is carried out iteratively during operation of such a power distribution system (100 on FIG. 1). The method of FIG. 3 is also similar to the method of FIG. 2, including as it does, monitoring (202) present power consumption (106); determining (204) whether the present power consumption (106) is greater than a predefined target power consumption (110) by the local load; if the present power consumption (106) is not greater, storing (206) locally generated power in the batteries; if the present power consumption (106) is greater: calculating (208) an amount (112) of locally generated power to provide to the electric utility; and providing (210) the amount (112) of locally generated power to the electric utility.

The method of FIG. 3 differs from the method of FIG. 2, however, in that the method of FIG. 3 includes determining that the present power consumption is greater than the predefined target power consumption by the local load only if the present state of charge (108) of the batteries is greater than a predetermined threshold (108). That is, in the method of FIG. 3, upon a determination that the present power consumption (106) is greater than the target power consumption (110), the control module determines (302) whether the present state of charge (108) of the batteries is greater than a predetermined threshold (304). If the present state of charge of the batteries is greater than the predetermined threshold (304), then the method of FIG. 3 continues by calculating (208) an amount of power to provide and providing (210) the amount.

Figure 4:
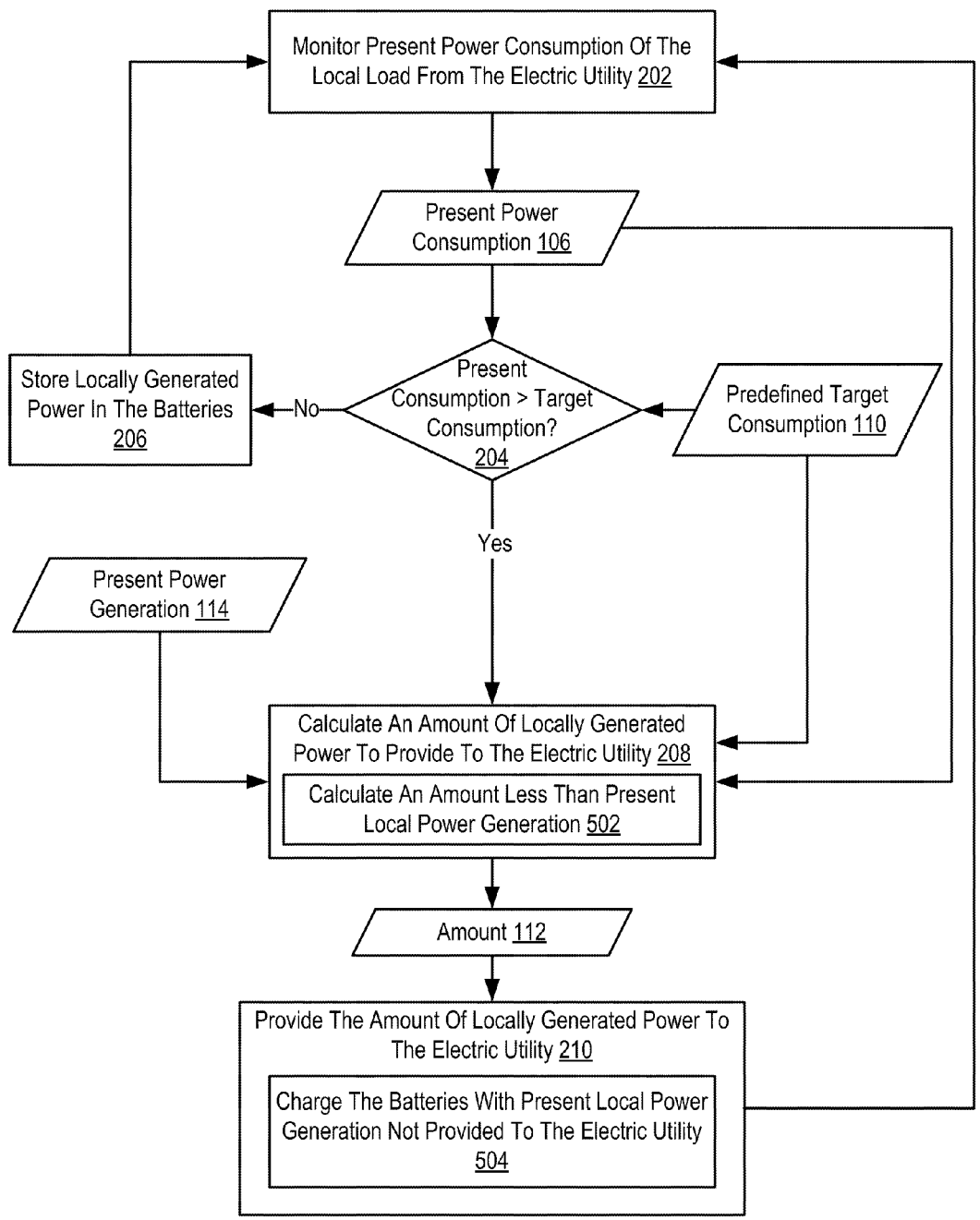
FIG. 4 sets forth a flow chart illustrating a further exemplary method for maintaining uniform power consumption from an electric utility by a local load in a power distribution system according to embodiments.

For further explanation, FIG. 4 sets forth a flow chart illustrating a further exemplary method for maintaining uniform power consumption from an electric utility by a local load in a power distribution system according to embodiments. The method of FIG. 4 is similar to the method of FIG. 2 in that the method of FIG. 4 is also carried out by a control module (152 on FIG. 1) to maintain uniform power consumption from an electric utility (128 on FIG. 1) by a local load (106 on FIG. 1) in a power distribution system (100 on FIG. 1) where the power distribution system includes a DRG system (122 on FIG. 1) and the DRG system is capable of providing power to the electric utility (128 on FIG. 1) and one or more batteries (120 on FIG. 1) for storage. The method of FIG. 4, also like the method of FIG. 2, is carried out iteratively during operation of such a power distribution system (100 on FIG. 1). The method of FIG. 4 is also similar to the method of FIG. 2, including as it does, monitoring (202) present power consumption (106); determining (204) whether the present power consumption (106) is greater than a predefined target power consumption (110) by the local load; if the present power consumption (106) is not greater, storing (206) locally generated power in the batteries; if the present power consumption (106) is greater: calculating (208) an amount (112) of locally generated power to provide to the electric utility; and providing (210) the amount (112) of locally generated power to the electric utility.

The method of FIG. 4 differs from the method of FIG. 2, however, in that in the method of FIG. 4 calculating (208) an amount (112) of locally generated power to provide to the electric utility includes calculating (208) an amount of locally generated power to provide to the electric utility that is less than present local power generation (114) by the DRG system and providing (210) the amount (112) of locally generated power to the electric utility includes charging (504) the batteries with present local power generation not provided to the electric utility.

Calculating (208) an amount of locally generated power to provide to the electric utility that is less than present local power generation (114) by the DRG system may be carried out by determining that the amount of present local power generation (114) is greater than the difference in present power consumption (106) and the predefined target power consumption (110) such that providing all presently power consumption would lower power consumption, from the prospective of the electric utility, below the predefined target consumption. As such, according to the method of FIG. 3, the control module provides only enough power to the electric utility to meet the target power consumption (110) while diverting the remaining presently power generation (114) to the batteries for storage.

Figure 5:
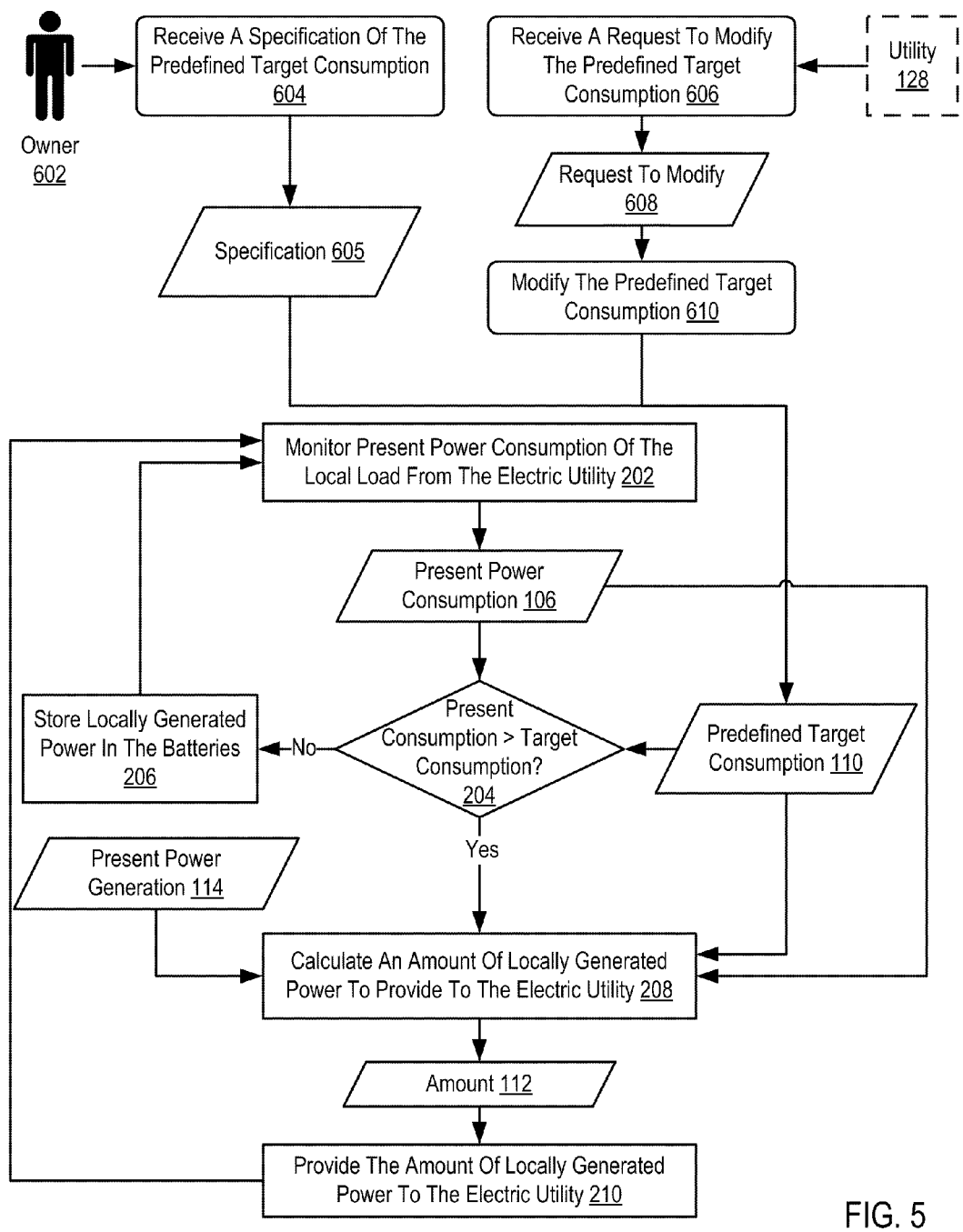
FIG. 5 sets forth a flow chart illustrating a further exemplary method for maintaining uniform power consumption from an electric utility by a local load in a power distribution system according to embodiments.

For further explanation, FIG. 5 sets forth a flow chart illustrating a further exemplary method for maintaining uniform power consumption from an electric utility by a local load in a power distribution system according to embodiments. The method of FIG. 5 is similar to the method of FIG. 2 in that the method of FIG. 5 is also carried out by a control module (152 on FIG. 1) to maintain uniform power consumption from an electric utility (128 on FIG. 1) by a local load (106 on FIG. 1) in a power distribution system (100 on FIG. 1) where the power distribution system includes a DRG system (122 on FIG. 1) and the DRG system is capable of providing power to the electric utility (128 on FIG. 1) and one or more batteries (120 on FIG. 1) for storage. The method of FIG. 5, also like the method of FIG. 2, is carried out iteratively during operation of such a power distribution system (100 on FIG. 1). The method of FIG. 5 is also similar to the method of FIG. 2, including as it does, monitoring (202) present power consumption (106); determining (204) whether the present power consumption (106) is greater than a predefined target power consumption (110) by the local load; if the present power consumption (106) is not greater, storing (206) locally generated power in the batteries; if the present power consumption (106) is greater: calculating (208) an amount (112) of locally generated power to provide to the electric utility; and providing (210) the amount (112) of locally generated power to the electric utility.

The method of FIG. 5 differs from the method of FIG. 2, however, in that the method of FIG. 5 includes two optional ways of defining a value of the predefined target power consumption (110). One such way included in the method of FIG. 5 is receiving (604), by the control module from an owner (602) of the power distribution system, a specification (605) of the predefined target power consumption (110). The control module may receive such a specification through a Graphical User Interface ('GUI') application presented to the owner on a console, such as the console (116) in the example of FIG. 1.

Another way of defining the value of the predefined target power consumption included in the method of FIG. 5 is receiving (606), by the control module from the electric utility (128), a request (608) to modify the predefined target power consumption (110) and upon approval by an owner (602) of the power distribution system, modifying (610), by the control module, the predefined target power consumption (110) in accordance with the electric utility's request. The control module may receive such a request (608) from the utility (128) through a data communications network, such as the WAN (101) in the example of FIG. 1.

Exemplary embodiments of the present invention are described largely in the context of a fully functional computer system for maintaining uniform power consumption from an electric utility by a local load in a power distribution system. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of maintaining uniform power consumption from an electric utility by a local load in a power distribution system, the power distribution system comprising a distributed renewable generation ('DRG') system, the DRG system capable of providing power to the electric utility and one or more batteries for storage, the method carried out iteratively during operation of the power distribution system, the method comprising:
monitoring, by a control module, present power consumption of the local load from the electric utility;
determining, by the control module, whether the present power consumption is greater than a predefined target power consumption by the local load;
if the present power consumption is not greater than the predefined target power consumption by the local load, storing, by the control module, locally generated power in the batteries;
if the present power consumption is greater than the predefined target power consumption by the local load:
calculating, by the control module, in dependence upon present local power generation by the DRG system, the predefined target power consumption, and the present power consumption of the local load, an amount of locally generated power to provide to the electric utility; and
providing, by the control module, the amount of locally generated power to the electric utility.

2. The method of claim 1 further comprising:
determining that the present power consumption is greater than the predefined target power consumption by the local load only if the present state of charge of the batteries is greater than a predetermined threshold.

3. The method of claim 1 wherein monitoring, by a control module, present power consumption of the local load from the electric utility further comprises monitoring, with a current sensor, current draw by the local load from the electric utility.

4. The method of claim 1 wherein:
calculating an amount of locally generated power to provide to the electric utility further comprises calculating an amount of locally generated power to provide to the electric utility that is less than present local power generation by the DRG system; and
providing the amount of locally generated power to the electric utility further comprises charging the batteries with present local power generation not provided to the electric utility.

5. The method of claim 1 further comprising:
receiving, by the control module from an owner of the power distribution system, a specification of the predefined target power consumption.

6. The method of claim 1 further comprising:
receiving, by the control module from the electric utility, a request to modify the predefined target power consumption; and
upon approval by an owner of the power distribution system, modifying, by the control module, the predefined target power consumption in accordance with the electric utility's request.

7. The method of claim 1 wherein the DRG system further comprises local power generation system selected from a group consisting of a photovoltaic ('PV') system, a micro-hydroelectric system and a wind turbine system.

8. The method of claim 1 further comprising:
connecting the local load to a transmission line from the electric utility; and
measuring, with a net-meter, the locally generated power provided to the electric utility, said net-meter further being configured to measure the present power consumption of power from the electric utility.

9. An apparatus for maintaining uniform power consumption from an electric utility by a local load in a power distribution system, the power distribution system comprising a distributed renewable generation ('DRG') system, the DRG system capable of providing power to the electric utility and one or more batteries for storage, the apparatus comprising a computer processor, a computer memory operatively coupled to the computer processor, the computer memory having disposed within it computer program instructions capable of:
iteratively during operation of the power distribution system:
monitoring, by a control module, present power consumption of the local load from the electric utility;
determining, by the control module, whether the present power consumption is greater than a predefined target power consumption by the local load;
if the present power consumption is not greater than the predefined target power consumption by the local load, storing, by the control module, locally generated power in the batteries;
if the present power consumption is greater than the predefined target power consumption by the local load:
calculating, by the control module, in dependence upon present local power generation by the DRG system, the predefined target power consumption, and the present power consumption of the local load, an amount of locally generated power to provide to the electric utility; and providing, by the control module, the amount of locally generated power to the electric utility.

10. The apparatus of claim 9 further comprising computer program instructions capable of:

determining that the present power consumption is greater than the predefined target power consumption by the local load only if the present state of charge of the batteries is greater than a predetermined threshold.

11. The apparatus of claim 9 wherein monitoring, by a control module, present power consumption of the local load from the electric utility further comprises monitoring, with a current sensor, current draw by the local load from the electric utility.

12. The apparatus of claim 9 wherein:

calculating an amount of locally generated power to provide to the electric utility further comprises calculating an amount of locally generated power to provide to the electric utility that is less than present local power generation by the DRG system; and providing the amount of locally generated power to the electric utility further comprises charging the batteries with present local power generation not provided to the electric utility.

13. The apparatus of claim 9 further comprising computer program instructions capable of:

receiving, by the control module from an owner of the power distribution system, a specification of the predefined target power consumption.

14. The apparatus of claim 9 further comprising computer program instructions capable of:

receiving, by the control module from the electric utility, a request to modify the predefined target power consumption; and upon approval by an owner of the power distribution system, modifying, by the control module, the predefined target power consumption in accordance with the electric utility's request.

15. The apparatus of claim 9 wherein the DRG system further comprises local power generation system selected from a group consisting of a photovoltaic ('PV') system, a micro-hydroelectric system and a wind turbine system.

16. The apparatus of claim 9 further comprising:

a connector configured to connect the local load to a transmission line from the electric utility; and a net-meter configured to measure the locally generated power provided to the electric utility, said net-meter further being configured to measure the present power consumption of power from the electric utility.

17. A computer program product for maintaining uniform power consumption from an electric utility by a local load in a power distribution system, the power distribution system comprising a distributed renewable generation ('DRG') system, the DRG system capable of providing power to the electric utility and one or more batteries for storage, the computer program product disposed in a non-transitory computer readable recording medium, the computer program product comprising computer program instructions capable of:

iteratively during operation of the power distribution system:

monitoring, by a control module, present power consumption of the local load from the electric utility;

determining, by the control module, whether the present power consumption is greater than a predefined target power consumption by the local load;

if the present power consumption is not greater than the predefined target power consumption by the local load, storing, by the control module, locally generated power in the batteries;

if the present power consumption is greater than the predefined target power consumption by the local load:

calculating, by the control module, in dependence upon present local power generation by the DRG system, the predefined target power consumption, and the present power consumption of the local load, an amount of locally generated power to provide to the electric utility; and providing, by the control module, the amount of locally generated power to the electric utility.

18. The computer program product of claim 17 further comprising computer program instructions capable of:

determining that the present power consumption is greater than the predefined target power consumption by the local load only if the present state of charge of the batteries is greater than a predetermined threshold.

19. The computer program product of claim 17 wherein monitoring, by a control module, present power consumption of the local load from the electric utility further comprises monitoring, with a current sensor, current draw by the local load from the electric utility.

20. The computer program product of claim 17 further comprising computer program instructions capable of:

receiving, by the control module from an owner of the power distribution system, a specification of the predefined target power consumption.

21. The computer program product of claim 17 further comprising computer program instructions capable of:

receiving, by the control module from the electric utility, a request to modify the predefined target power consumption; and upon approval by an owner of the power distribution system, modifying, by the control module, the predefined target power consumption in accordance with the electric utility's request.

22. The computer program product of claim 17 wherein the DRG system further comprises local power generation system selected from a group consisting of a photovoltaic ('PV') system, a micro-hydroelectric system and a wind turbine system.

23. The computer program product of claim 17, wherein a connector is used to connect the local load to a transmission line from the electric utility, the computer program product further comprising:

receiving measurements from a net-meter configured to measure the locally generated power provided to the electric utility, said net-meter further being configured to measure the present power consumption of power from the electric utility.

* * * * *